Dec. 23, 1952     R. B. LOVELAND     2,622,315
BUSHING PULLER

Filed Oct. 23, 1947     5 Sheets-Sheet 1

Inventor
Roy B. Loveland
by Mawhinney & Mawhinney
Attorneys

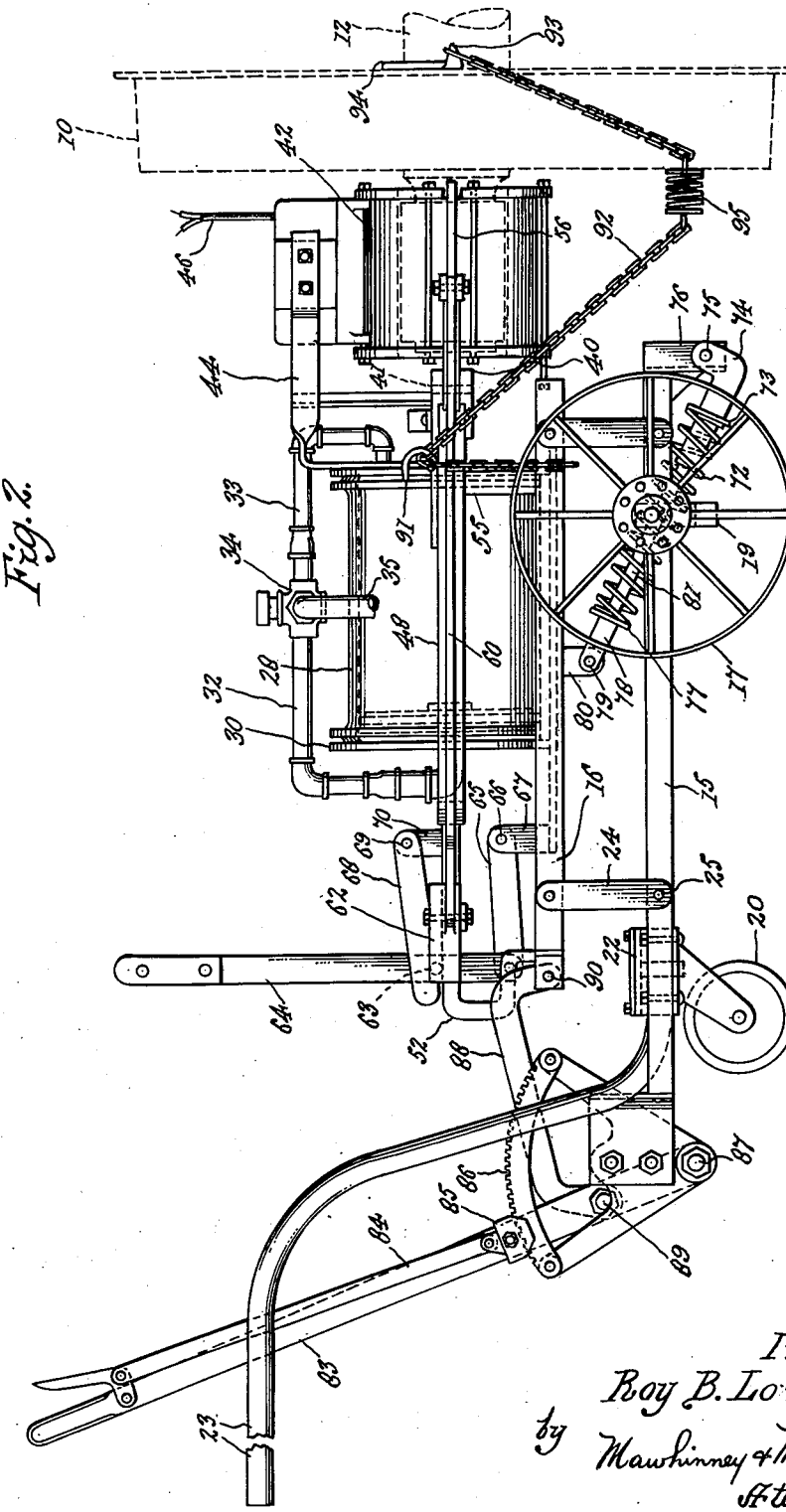

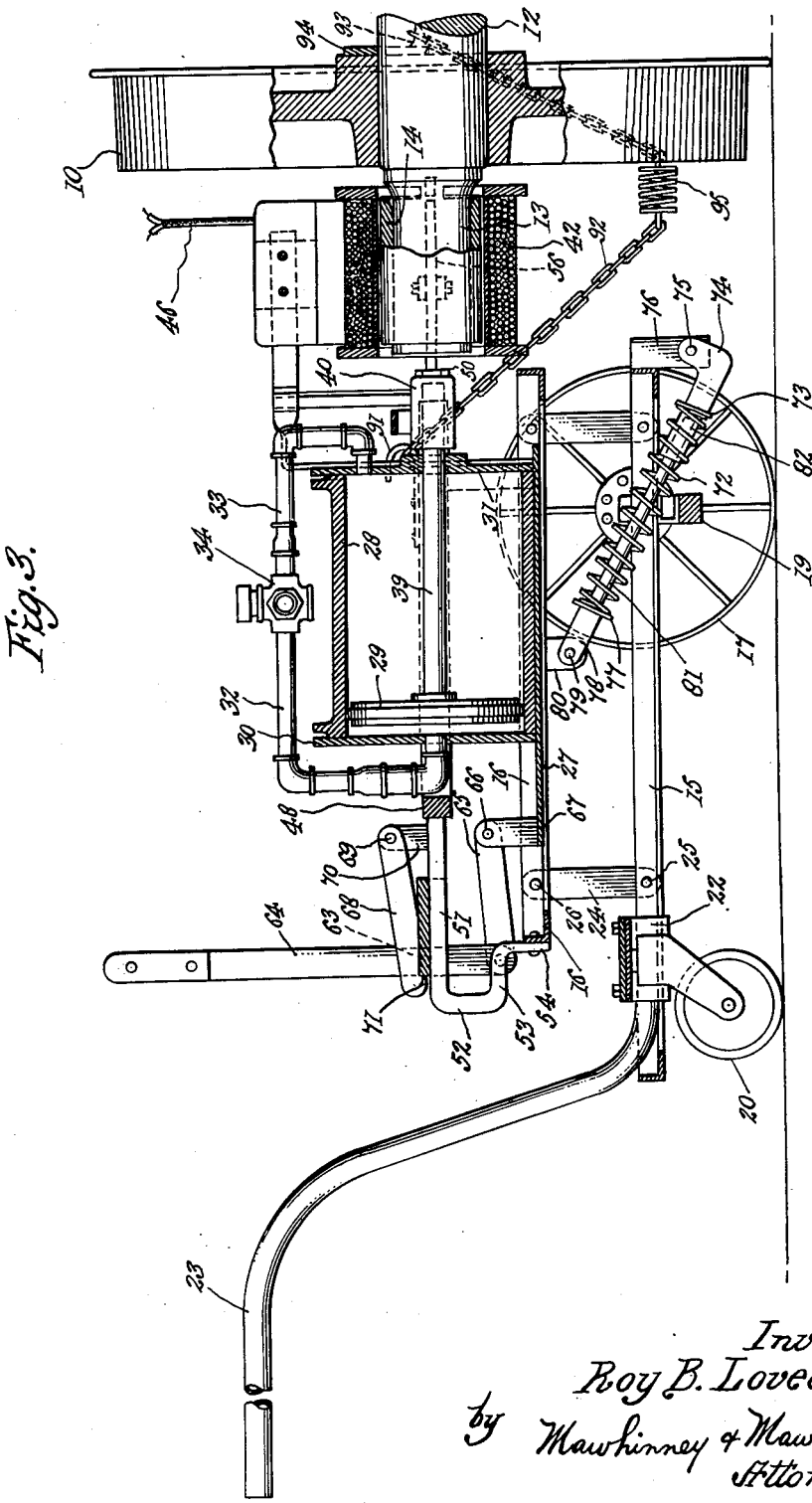

Dec. 23, 1952     R. B. LOVELAND     2,622,315
BUSHING PULLER
Filed Oct. 23, 1947     5 Sheets-Sheet 4
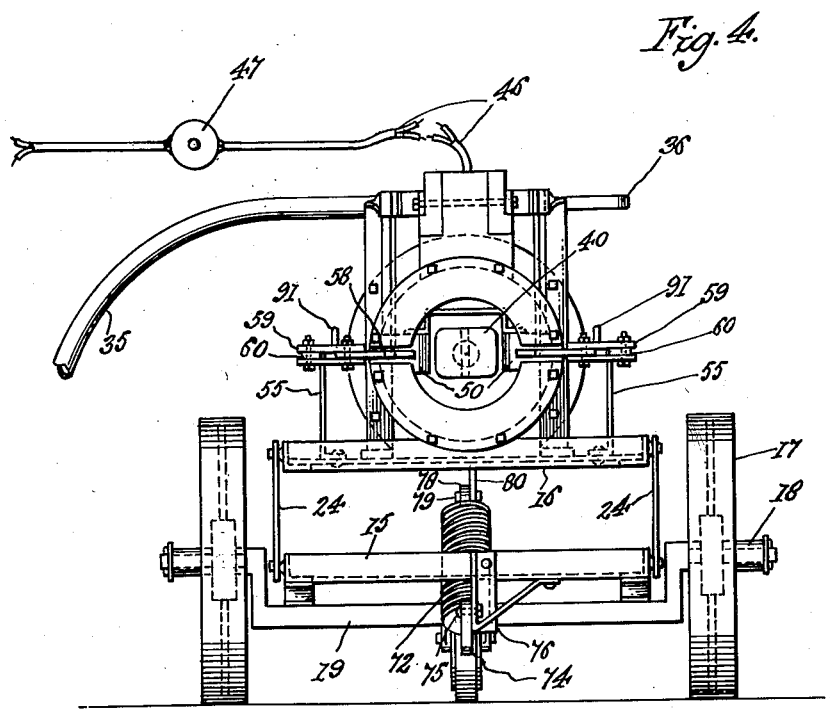
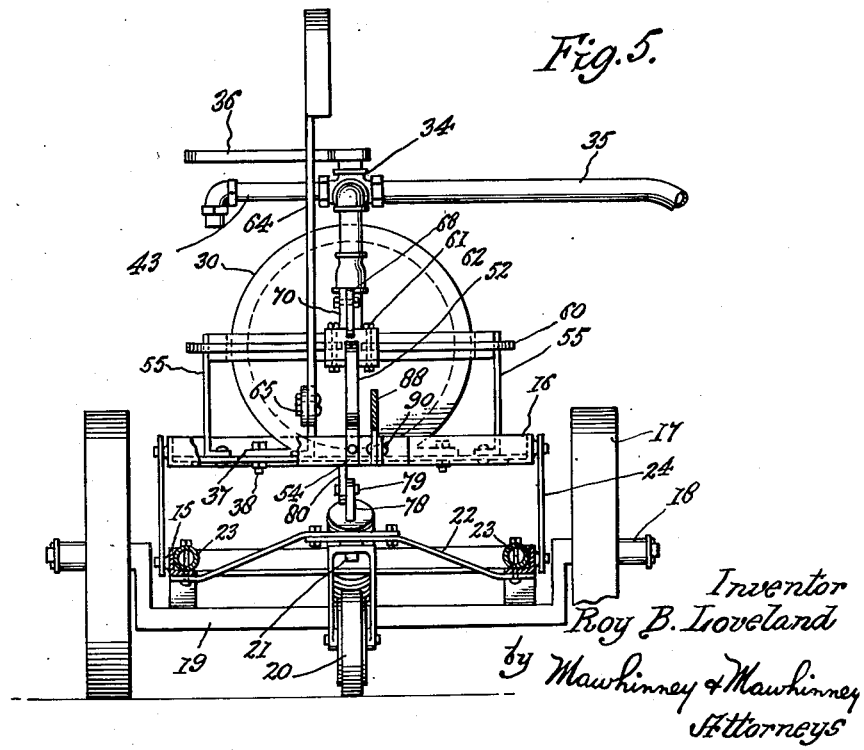
Inventor
Roy B. Loveland
by Mawhinney & Mawhinney
Attorneys Dec. 23, 1952 — R. B. LOVELAND — 2,622,315
BUSHING PULLER
Filed Oct. 23, 1947 — 5 Sheets-Sheet 5

Inventor
Roy B. Loveland
by Mawhinney & Mawhinney
Attorneys

Patented Dec. 23, 1952

2,622,315

UNITED STATES PATENT OFFICE 2,622,315

BUSHING PULLER

Roy B. Loveland, Roanoke, Va., assignor to
Charles M. O'Boyle, Wilmington, Del.

Application October 23, 1947, Serial No. 781,677

4 Claims. (Cl. 29—252)

The present invention relates to improvements in bushing puller and more particularly relates to a machine designed to remove the bushings which are shrunk on the outer journals of railway car axles and form the inner races of the roller bearings.

The removal of these bushings is required for periodic inspections of the axle portions concealed by the bushings when in place.

The invention contemplates a machine or apparatus involving heating and pulling units so coordinated that an electric heating coil which is moved to envelop the bushing or inner race heats the same to expand such bushing to loosen the same from its shrunk fit on the car axle journal, and thereupon the pulling unit comes into play and pulls the bushing off the journal.

The invention also contemplates a new method of operation in the removal of inner races or bushings from axle journals in that as a first step in the mode of operation the bushing is put under the force of an applied pressure directed to remove the same, and as a second step the circuit through an electric heating coil is closed whereby the heat from the coil which is in external enveloping relationship to the bushing will heat the bushing without directly heating the axle or the enclosed journal; the end result being that as the bushing is subjected to the removal force all during the heating step, immediately upon expansion of the bushing away from the journal sufficiently to surrender to the degree of force applied, such bushing will be pulled from the journal; this method of operation being important not only in freeing and removing the bushing or inner race in a minimum of time with the greatest economy of electrical energy and pulling force but also in effecting the removal in a minimum of time and before heat is communicated by conduction or otherwise to the axle journal which might result in its expansion along with the bushing, thus defeating the purpose of the heating step which is done by a coil of high resistance and high heating capacity.

Another object of the invention is to unite the heating and pulling units on a vehicle for maintaining their proper relative positions and to enable same to be moved to any desired location and applied to a bushing in a minimum of time.

A further object of the invention resides in providing upon a vehicle carrying the heating and pulling units an adjusting device for raising and lowering the units to various elevations to bring the same in axial alignment with the axle journals and bushings to be operated upon.

With the foregoing and other objects in view the invention will be more fully described hereinafter and more particularly pointed out in the appended claims.

In the drawings in which the same reference characters refer to the same parts throughout the several views, Figure 1, top plan view of a bushing puller as constructed in accordance with the present invention.

Figure 2 is a side elevation of the same.

Figure 3 is a longitudinal central section taken through the improved puller.

Figure 4 is an end elevational view of the improved puller taken from the right-hand end of Figure 2.

Figure 5 is a transverse section taken on the line 5—5 of Figure 1.

Figure 1:
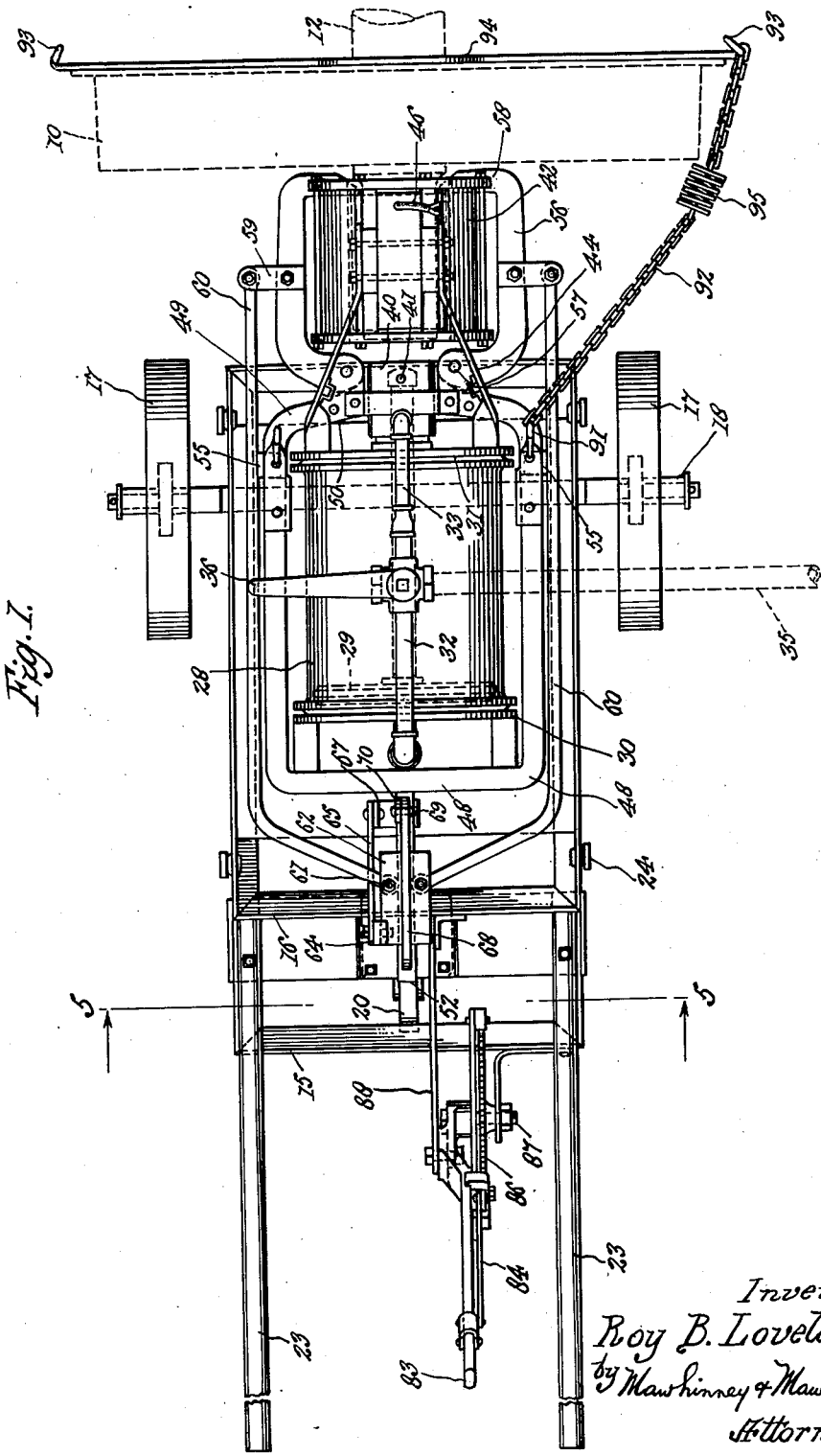

Referring more particularly to drawings, 10 designates a railway car wheel, 12 the railway car axle supported by the wheel and 13 the reduced journal which projects outwardly beyond the wheel 10 and receives the inner race or bushing 14 which is shrunk thereon in the usual manner.

The improved machine is supported for movement on a truck or carriage which comprises a lower main frame 15 and an upper supplemental or auxiliary frame 16. The forward end of the main frame is supported by a pair of wheels 17 which are mounted on the end trunnions 18 of an offset or dropped axle 19. The rear end of the main frame is supported on a single centrally disposed caster wheel 20 swivelly mounted, as at 21, in a cross bar 22 spanning the forward portion of the main frame 15.

Both frames 15 and 16 may economically and for purposes of strength be made from angle iron in an open rectangular formation. Two handles 23 are attached to the rear portion of the main frame 15 and are bent upwardly at their rear ends so as to be conveniently grasped by a man walking at the rear of the truck or carriage in the act of pushing the same.

Links 24, preferably four in number with a pair at the front portion and a pair at the rear portion of the carriage are connected by pivots 25 and 26 to the lower main frame 15 and the upper supplemental frame 16 respectively to enable the supplemental or auxiliary upper frame 16 to be adjusted at various vertical heights from the main frame 15.

A thick or heavy plate 27 is rigidly mounted in the supplemental frame 16 and a motor is carried by such supplemental frame. In the instance shown, this motor comprises a cylinder 28 with its axis disposed horizontally and a piston or plunger 29 mounted to reciprocate substantially horizontally in the cylinder which is closed by the end heads 30 and 31. Branch pipes 32 and 33 lead from a four-way valve 34 and communicate respectively with the cylinder at opposite sides of the piston 29 through the heads 30 and 31 for alternately supplying one end or the other of the cylinder with fluid under pressure while the opposite side is being evacuated. A supply pipe 35 communicates with a source of compressed air, hydraulic fluid, or other motive fluid and with the valve 34. The valve 34 is conveniently operated by a lever 36 and is also connected to the exhaust pipe 43.

The cylinder 28 has outstanding base flanges 37 by which it is rigidly secured to the plate 27 in any suitable manner as by the bolts 38.

The piston 29 is affixed to the rear end of a piston rod 39 which slides through the forward cylinder head 31 and carries forwardly of such cylinder head 31 a block 40. This block 40 is mounted to the free end of the piston rod 39 by a vertical or other pivot 41 which enables it to be self-aligning and to accommodate itself to the outer end of the journal 13. Such block forms an abutment when engaging the outer free end of the journal 13 to hold the piston 29 stationary as hereinafter explained.

A tubular electric heating coil 42 is carried by brackets 44 forwardly of the motor cylinder 28 co-axially with said cylinder. The brackets 44 are bolted, as indicated at 45 to the end head 31 and to the cylinder 28 as indicated in Figure 4 and such brackets are angled and are in effect outriggers for the purpose of suspending the hollow electric coil outwardly beyond the forward ends of the frames 15 and 16 to carry the coil in a favorable position for sliding over the bushing 14 and journal 13, as shown in Figure 3. The coil 42 is energized from an external source of electricity through the cable leads 46 and a switch 47 enables the operator to energize and deenergize such electric heating coil 42.

A yoke 48 is formed around the cylinder 28 on substantially its horizontal line, the forward ends 49 of this yoke being open centrally at the front end of the cylinder 28 where such arms carry stationary blocks 50 at the sides of the movable swivel block 40. The rear end of the yoke is connected to a bar 51 which has a downwardly bent vertical portion 52, a horizontal portion 53 and a second vertically bent portion 54, which latter is riveted or otherwise affixed to the rear portion of the supplemental upper frame 16. At its front side portions the yoke 48 is supported from the supplemental frame 16 as by standards 55 best shown in Figure 4.

Arms 56 offset to extend outwardly beyond the sides of the electric coil 42 have rear ends pivoted at 57 to the stationary blocks 50 in order to swing in and out horizontally. The outer or forward ends of the arms 56 carry inturned hooks or jaws 58 constructed to engage the end of the bushing 14 next the railway car wheel 10.

Lugs 59 extend out from intermediate parts of the arms 56. The forward ends of links 60 are pivoted in the outer ends of the lugs 59, such links 60 extending in substantial parallelism along the outside portions of the yoke 48 and having their rear ends inturned and pivoted at 61 to a sliding crosshead 62. The crosshead 62 slides on the bar 51. A lever 64 is pivoted at 63 to the crosshead 62. At its lower end the lever is pivoted to the rear end of a horizontal link 65. The forward end of the link 65 is pivoted at 66 to an upstanding bracket 67 affixed to the supplemental upper frame 16 or its plate 27.

A safety catch 68 is pivoted at 69 to a bracket 70 upstanding from the bar 51. Such catch 68 has a notch or shoulder 71 on the rear portion of its under edge to interlock with the rear edge of the crosshead 62. When interlocked as shown in Figure 3, the bushing pulling jaws or hooks 58 are held in closed position behind the inner edge of the bushing 14, which position is shown in Figures 1 and 2. In this position the lever 64 may be substantially vertical as shown in Figure 3.

The top supplemental frame 16 of the carriage is biased to an uppermost position shown in Figures 2 and 3 where the links 24 are substantially vertical by means of a coil spring 72 which is connected between the two frames 15 and 16. One end of the spring abuts against a shoulder 73 of a spring shackle 74 which is pivoted at 75 to a depending bracket 76 on the forward central portion of the lower rigid frame 15. The upper end of the spring abuts against a shoulder 77 of a spring shackle 78 pivoted at 79 to a lug 80 extending down from the plate 27 of the upper frame 16. Telescoping guide bars 81 and 82 project axially through the helical spring 72 to hold the convolutions thereof in a correct right line in expanding and contracting, such telescoping guide bars 81 and 82 being carried respectively by the shackles 78 and 74. Thus the spring 72 counterbalances the weight of the upper frame 16 and of the motor, pulling jaws, electric heating coil 42 and the other parts carried upon such upper frame 16.

The upper frame 16 is raised and lowered by a lever 83 having a movable latch rod 84 operating a movable latch member 85 which cooperates with a segment 86 at the center of which the lever 83 is fulcrumed as indicated at 87. The segment 86 is carried by the rear central portion of the lower rigid frame 15. The lever is connected to the upper frame 16 by a link 88 which is pivoted to the lever as at 89 and to the upper frame as at 90.

The yoke 48 also carries upstanding hooks 91 through which selected links of two side chains 92 may be engaged. The forward ends of the chains are engaged through hooks 93 on a yoke bar 94. In the chains are included coil spring sections 95.

Figure 6:
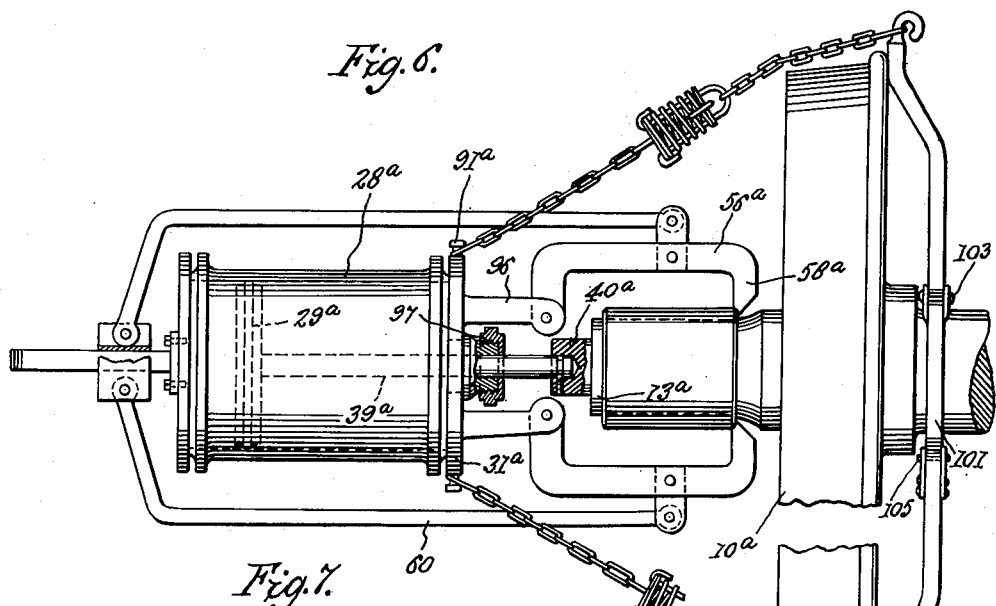
Figure 6 is a top plan view of a modified form of a machine shown applied to the bushing and axle journal.
Figure 7:
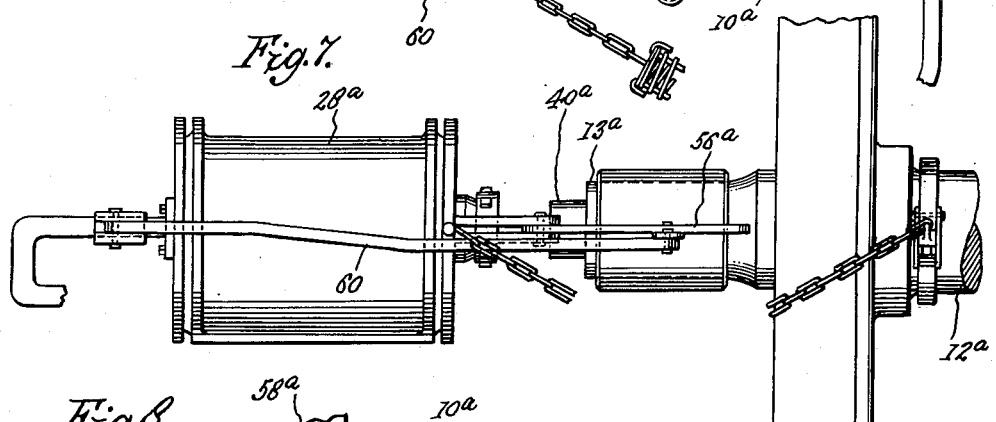
Figure 7 is a side elevation of the same.

Referring more particularly to Figures 6 and 7, a slightly modified form of device is shown in which the yoke 48 is dispensed with and the jaw arms 56ª are pivoted upon brackets 96 which outstand from the front cylinder head 31ª at opposite sides of the piston rod 39ª and movable block 40ª. A stuffing box 97 is shown carried by the cylinder head 31ª through which the piston rod 39ª reciprocates without leakage. In these figures the swivel movable block 40ª is shown as having been brought firmly up against the outer end of the car axle journal 13ª. In this position the piston 29ª is shown in Figure 6 to have moved a short distance forward in the cylinder 28ª.

The hooks 91ᵃ are carried by the forward head 31ᵃ.

The other parts shown in Figures 6 and 7 conform to those already described and are similarly numbered.

Figure 8:
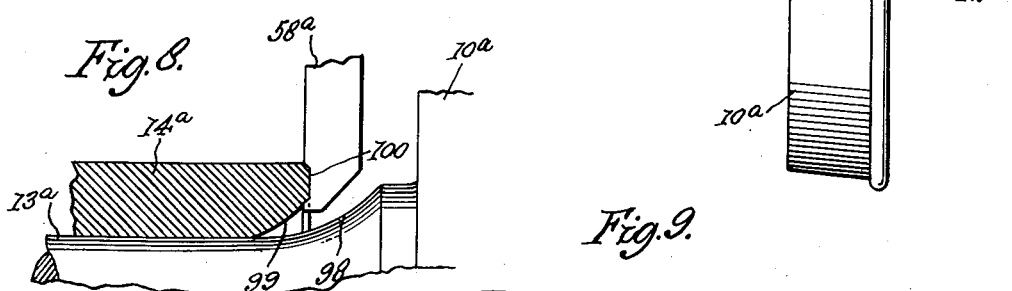
Figure 8 is an enlarged fragmentary section taken through a portion of a bushing and car journal and showing the application of a pulling jaw thereto and, Figure 9 is a plan view of a modified form of yoke bar and clamp.

Referring more particularly to Figure 8 a jaw 58ᵃ is shown as engaged with a bushing 14ᵃ. In accordance with present practices the inner end of the journal is formed with a curved or tapered section and the bushing or inner race 14ᵃ is formed with a complemental curved or tapered section 99. The jaws 58ᵃ are formed with recesses 100 in their rear faces of a size and shape to fit the inner end of the bushing 14ᵃ, the inner ends of the jaws 58ᵃ terminating short of the outside surface of the journal 13ᵃ so as not to mar or scratch such surface in the stripping action of the jaws 58ᵃ.

Figure 9:
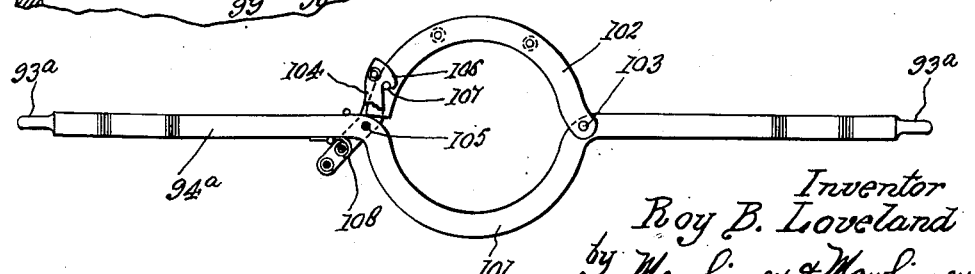

Referring more particularly to Figure 9 the yoke bar 94ᵃ having the hooks 93ᵃ at its ends has a central curved offset 101 of a substantially semi-circular form to fit about half the axle 12ᵃ while a companion curved section 102 is pivoted at 103 to one side of the offset 101 and is free to open and close about this pivot 103 whereby to admit the hook bar to the axle 12ᵃ and permit its removal therefrom. At the other side of the offset 101 the yoke bar 94ᵃ carries a latch 104 pivoted at 105 to the yoke bar and having a bill 106 for interlocking with a pin 107 of the clamp 102. A spring 108 on the yoke bar 94ᵃ engages the latch 104 to bias the same to latching position.

It will be understood that instead of the use of the wheels 17 and 20 the carriage may be supported by chains from an overhead crane or by means of tackle which will permit the carriage to be raised and lowered to car positions with respect to axle journals and their bushings.

In the use of the machine, the machine is moved up to a position adjacent to a car wheel 10 and its axle 12 from which the outer race and the roller bearing has been previously removed. As the machine is moved toward the journal and bushing the lever 83 may be operated to bring the coil to a correct vertical position whereby it may be slid over the bushing. In this position the jaw arms 56 or 56ᵃ have been previously opened by first lifting the latch 68 and pulling the lever 64 backwardly to slide the crosshead 62 backwardly which pulls upon the link 60 and causes the arms 56 to rotate about the pins 57. When the machine has been correctly moved to final position with the electric coil 42 fully enveloping the bushing 14 or 14ᵃ, the lever 64 is pushed forwardly thus closing the arms 56 or 56ᵃ and causing the jaws 58ᵃ to move in behind the bushing 14 or 14ᵃ. In the final position the latch 68 will snap back and lock the crosshead 62 in the locked position. The arms 56 or 56ᵃ will rotate the recesses 100 into engagement with the inner end of the bushing 14 or 14ᵃ; or a slight rearward movement of the machine may cause the recesses 100 to move up on the reduced inner end of the bushing. In any event the jaws will assume a firm hold on the bushing as soon as fluid has been turned into the left end of the cylinder 28 or 28ᵃ thus causing the movable block 40 or 40ᵃ to move up and engage the outer end of the car journal 13 or 13ᵃ.

The yoke bar 94 is put in place and the chains 92 connected between the hooks 93 and 91. In this initial position the chains will be slack and will fall down to some such position as indicated in Figure 2.

The valve 34 is then turned so that the branch 32 is in communication with the supply of active fluid and such fluid is admitted to the left end of the piston 29 or 29ᵃ. The piston can only move to the right or forwardly a short distance, its movement being arrested when the movable block 40 or 40ᵃ encounters the outer end of the car journal 13 or 13ᵃ. The piston 29 or 29ᵃ thereupon becomes immovable and the fluid in the left end of the cylinder 28 or 28ᵃ expands against the rear head 30 and drives the cylinder 28 or 28ᵃ backwardly. Inasmuch as the entire carriage including both lower and upper frames 15 and 16 is affixed to the cylinder 28 or 28ᵃ the entire carriage is thus moved backwardly, pulling with the same the arms 56 or 56ᵃ and the jaws 58 or 58ᵃ. Initially this action is resistant by the tightness of fit of the bushing 14 or 14ᵃ on the car journal 13 or 13ᵃ thus the pulling of the bushing off the journal is not accomplished at this time.

As soon as the machine is thus set up with this potential pulling force acting on the bushing, the switch 47 is closed thereby energizing the electric heating coil 42 which immediately diffuses a very high heat directed only and solely upon the included bushing. Under the influence of this heat the bushing will expand. It will only require a very short interval of time before the bushing has been sufficiently expanded to free it from its shrunk fit on the axle journal and to surrender to the relatively large potential pulling force developed by the motor through the hooks 58 or 58ᵃ.

Thus at the instant that the bushing is freed by the heating effects of the electric resistance coil the potential pull of the jaws becomes kinetic and immediately and with great force strips the bushing from the journal by a movement of the entire carriage in a direction away from the car wheel. This carriage movement is sudden and accompanied by great force and the side chains 92 will allow limited movement of the carriage sufficient to entirely strip the bushing from the car journal but will then become taut and the spring sections 95 expanded to arrest the movement of the carriage with a resilient softening action which will not result in the breaking of any chain links, hooks or other parts. When the bushing has been pulled from the axle, the jaws 58 are opened and the bushing is removed from the heating coil 42.

During this rear movement of the cylinder on the piston 29 the four-way valve 34 is exhausting the air through the branch connection 33 and exhaust pipe 43. The handle 36 of the four-way valve 34 is thereafter turned to introduce the compressed air or other active fluid through the branch connection 33 and place the offset connection 32 in communication with the exhaust pipe 43; whereupon the piston 29 will be driven rearwardly in the cylinder 28 and the parts restored to the original position ready for the succeeding operation. It will be readily understood that with a constant and uniform pressure on the end of the axle and reacting on the bushing during the entire heating process, there is no chance of heating the bushing beyond the amount required for removal. No straight timing device could be adapted to furnish proper heating for the infinite variations encountered in the fit of bushing and axle.

While I have disclosed herein the best form of the invention known to me at the present time, I desire it to be understood that I reserve the right to make changes and modifications in the herein described embodiment of the invention provided such changes fall within the scope of the following claims.

What I claim is:

1. A machine for stripping bushings from axles which comprises a movable carriage, a heating coil mounted on said carriage and adapted to be arranged about the bushing to heat the same, means mounted on said carriage and movable therewith for engaging the inner end portion of said bushing, motor means operatively connected to said last mentioned means for applying force to said bushing in a direction substantially parallel to the central longitudinal axis of the bushing, said motor comprising a cylinder and piston mounted on said carriage, a piston rod attached to said piston and adapted to be moved into engagement with the outer end of said axle, and means for actuating said motor upon engagement of said means with the inner end of the bushing and said piston rod with the outer end of said axle to cause the carriage to move away from said axle and exert a pulling force on said bushing concurrently with the application of heat to said coil.

2. In a machine for pulling car wheel bushings from axles, a movable carriage, a heating coil mounted on said carriage and adapted to be arranged about the bushing to be pulled to heat the same, movable hooks carried by said carriage for engaging the inner end portion of said bushing, a motor comprising a cylinder and piston mounted on said carriage, a piston rod operable by said piston and adapted to be moved into engagement with a journal of an axle, said hooks being operatively connected to said carriage and adapted to extend around said heating coil and engage said bushing, and means for actuating said motor upon engagement of said hooks with said bushing and said piston rod with said journal to cause the carriage to move away from said journal and exert a pulling force on said hooks simultaneously with the application of heat to said coil.

3. A machine for stripping bushings from axles as claimed in claim 1 characterized by the fact that the first named means comprises arms pivoted on the carriage forwardly of said heating coil having outwardly offset portions extending outwardly of said coil, and jaws on the rear end portions of said arms for extending inwardly across the rear end of said coil and into engagement with the inner end of the bushing.

4. A machine for stripping bushings from axles as claimed in claim 1 characterized by the fact that said first named means comprises arms movably mounted on said carriage, jaws on the arms for engagement with the inner end of the bushing, and means on the carriage for moving said arms inwardly and outwardly to cause engagement and disengagement of the jaws with and from the bushing.

ROY B. LOVELAND.

REFERENCES CITED

The following references are of record in the file of this patent:

UNITED STATES PATENTS

| Number | Name | Date |
|---|---|---|
| 541,507 | Sellers | June 25, 1895 |
| 881,471 | Hoffman | Mar. 10, 1908 |
| 1,435,753 | Stolz | Nov. 14, 1922 |
| 1,514,167 | Morgan | Nov. 4, 1924 |
| 1,760,989 | Lewis | June 3, 1930 |
| 1,899,135 | Schaffer | Nov. 29, 1932 |
| 1,955,728 | Allen | Apr. 24, 1934 |
| 1,975,422 | Hellenbroich | Oct. 2, 1934 |
| 2,003,756 | Nagel | June 4, 1935 |
| 2,145,834 | Irven | Jan. 31, 1939 |
| 2,152,946 | Barltrop | Apr. 4, 1939 |
| 2,196,115 | Jacobson | Apr. 2, 1940 |
| 2,410,902 | Roberts | Nov. 12, 1946 |
| 2,476,728 | Heim | July 19, 1949 |
| 2,541,160 | Heim | Feb. 13, 1951 |